(No Model.)
R. N. APPLEGATE.
Loop for Stirrup Straps.
No. 241,273.   Patented May 10, 1881.
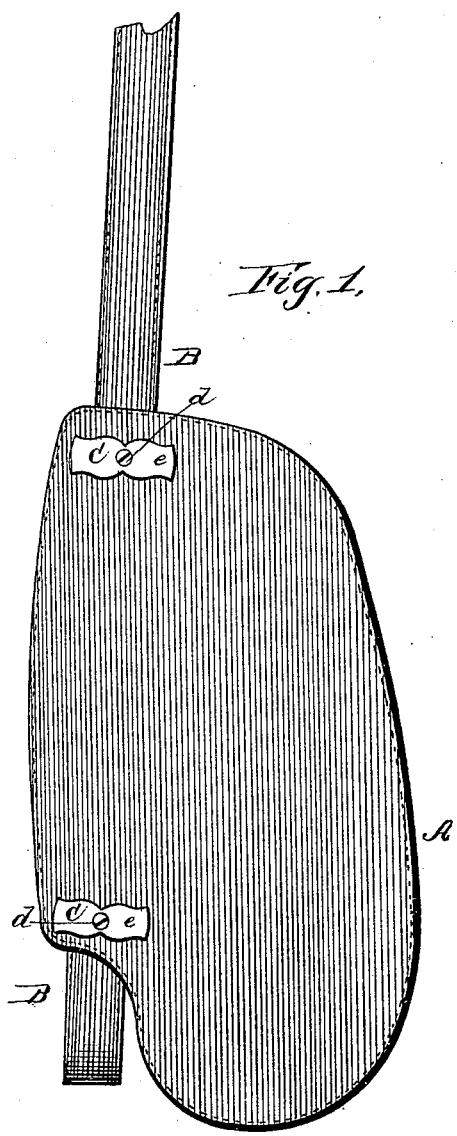
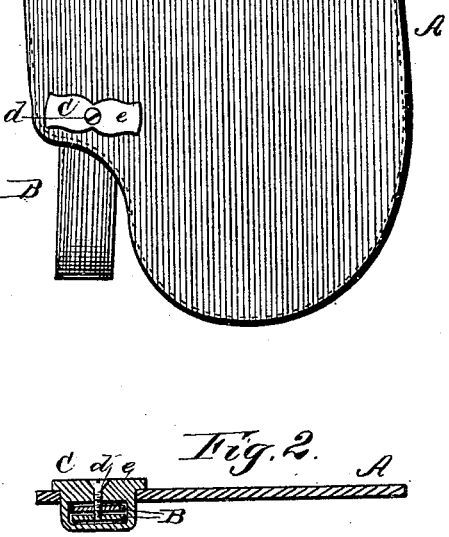
Witnesses:
H. C. McArthur
John C. Rogers
Inventor:
Robert N. Applegate
per Wm. Alexander
Attorney

UNITED STATES PATENT OFFICE.

ROBERT N. APPLEGATE, OF SARDIS, KENTUCKY.

LOOP FOR STIRRUP-STRAPS.

SPECIFICATION forming part of Letters Patent No. 241,273, dated May 10, 1881.

Application filed February 19, 1881. (No model.)

*To all whom it may concern:*

Be it known that, ROBERT N. APPLEGATE, of Sardis, in the county of Mason and State of Kentucky, have invented certain new and useful Improvements in Loops for Stirrup-Straps; and I do hereby declare that the following is a full, clear, and exact description thereof, reference being had to the accompanying drawings, and to the letters of reference marked thereon, which form part of this specification, and in which—

Figure 1 is a side elevation, and Fig. 2 a cross-section, of a leg-guard, showing the application of my device, and Fig. 3 a perspective view of the loop itself.

The object of this invention is to provide a simple, cheap, and effective method of securing the stirrup-straps of a saddle to its fenders or skirts; and it consists in the employment of a suitably-constructed loop, adapted to extend through the fender, to encircle the strap on the under side thereof, and supplied with a screw or equivalent device for securing and holding the parts in close contact with each other, thus preventing the straps from twisting or the stirrups from becoming displaced thereon.

To enable others skilled in the art to which my invention appertains to make and use the same, I will now proceed to describe its construction and application.

A represents a fender or skirt of a saddle, B the stirrup-strap, and C the loop, which latter device I prefer to construct as shown, or substantially as shown, in Fig. 3. The top part of the loop is provided with plate e, and through its center is a suitable hole for the admission of a screw, d, or other equivalent fastening. The plate e may be made ornamental in design, and should be of sufficient length and width to completely cover the slots in the fender over which it is placed. It should also be supplied with a bar or projection, f, on its under side, as shown, which extends nearly through the slotted fender and forms a firm seat for the screw, as seen in Figs. 2 and 3.

The method of applying my device is very simple. After forming suitable slots in the fender and holes in the strap, the loops are inserted in said slots, and the stirrup-straps run through them on the under side of the fender or skirt. When the straps have been properly adjusted—that is to say, when the holes in them are opposite the holes in the plate—the screw is turned until its head is even with the surface of the plate. The straps are thus firmly secured, and will be effectually prevented from twisting or becoming displaced.

Having thus fully described my invention, what I claim as new, and desire to secure by Letters Patent, is—

1. The loop C, having face-plate e, and adapted to extend through a slot in the fender and embrace the stirrup-strap, and provided with screw d, or other equivalent fastening device, all substantially as and for the purpose set forth.

2. In combination with a saddle-fender and stirrup-strap, the loop C, having bar f, plate e, and a suitable hole through said plate and bar for the admission of a screw, d, all substantially as and for the purpose set forth.

In testimony that I claim the foregoing as my own I affix my signature in presence of two witnesses.

ROBT. N. APPLEGATE.

Witnesses:
E. F. METCALFE,
G. S. WALL.